(12) United States Patent
Jamalabdollahi et al.

(10) Patent No.: US 12,413,356 B2
(45) Date of Patent: Sep. 9, 2025

(54) EXTREMELY HIGH THROUGHPUT TRIGGER BASED (EHTTB) LEGACY PREAMBLE PUNCTURING FOR FINE TIMING AND FREQUENCY OFFSET ESTIMATION

(71) Applicant: Cisco Technology, Inc., San Jose, CA (US)

(72) Inventors: Mohsen Jamalabdollahi, Akron, OH (US); Ardalan Alizadeh, Milpitas, CA (US); Audrey Yazdanparast, Richfield, OH (US); Matthew Aaron Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 492 days.

(21) Appl. No.: 17/820,404

(22) Filed: Aug. 17, 2022

(65) Prior Publication Data
US 2024/0072955 A1    Feb. 29, 2024

(51) Int. Cl.
*H04L 27/26* (2006.01)
*H04L 5/00* (2006.01)
*H04W 56/00* (2009.01)

(52) U.S. Cl.
CPC ......... *H04L 5/0044* (2013.01); *H04L 5/0007* (2013.01); *H04L 5/0053* (2013.01); *H04W 56/001* (2013.01)

(58) Field of Classification Search
CPC ............... H04L 5/0044; H04L 27/2613; H04L 27/2665; H04L 27/2675; H04W 56/001
See application file for complete search history.

(56) References Cited

U.S. PATENT DOCUMENTS

| 10,243,711 B1 | 3/2019 | Cao et al. |
|---|---|---|
| 2019/0116513 A1 | 4/2019 | Verma et al. |
| 2019/0141570 A1 | 5/2019 | Verma et al. |
| 2021/0152396 A1* | 5/2021 | Cherian ............... H04B 7/0452 |

(Continued)

FOREIGN PATENT DOCUMENTS

| WO | 2018/152224 A1 | 8/2018 | |
|---|---|---|---|
| WO | WO-2021081462 A2 * | 4/2021 | ........... H04B 7/0452 |

OTHER PUBLICATIONS

3GPP TSG-RAN WG1#86, R1-167504 Title:Puncturing sTTI in legacy TTI (Year: 2016).*

(Continued)

*Primary Examiner* — Faruk Hamza
*Assistant Examiner* — Abusayeed M Haque
(74) *Attorney, Agent, or Firm* — Merchant & Gould P.C.

(57) ABSTRACT

Legacy preamble puncturing for fine timing and frequency offset estimation may be provided. Within a user information field of a trigger frame, a legacy preamble puncturing pattern may be allocated to each of a plurality of client devices wherein each of the plurality of client devices is allocated with at least one respective corresponding non-overlapping sub-channel. Next, from each of the plurality of client devices on their respective corresponding non-overlapping sub-channel, a respective corresponding preamble may be received. Time and frequency synchronization may then be performed for each of the plurality of client devices based on their respective corresponding preamble.

17 Claims, 7 Drawing Sheets

(56) References Cited

U.S. PATENT DOCUMENTS

| | | | |
|---|---|---|---|
| 2021/0409181 A1 | 12/2021 | Chen et al. | |
| 2022/0182881 A1* | 6/2022 | Suh | C12N 15/111 |
| 2022/0345243 A1* | 10/2022 | Noh | H04L 5/0044 |
| 2022/0385437 A1* | 12/2022 | Shellhammer | H04L 5/0005 |
| 2023/0155782 A1* | 5/2023 | Sun | H04L 5/0073 |
| | | | 370/329 |
| 2023/0163808 A1* | 5/2023 | Lou | H04W 74/002 |
| | | | 455/101 |

OTHER PUBLICATIONS

3GPP TSG-RAN WG1, Meetng #86bis, R1-1610377 Title:Channel coding scheme for EMBB (Year: 2016).*

Deng et al., "IEEE 802.11be—Wi-Fi 7: New Challenges and Opportunities", in IEEE Communications Survey's & Tutorials, vol. 22, No. 4, pp. 2136-2166, Fourthquarter 2020, doi: 10.1109/COMST.2020.3012715.

* cited by examiner

User Information Field of the EHT-TB Trigger Frame

| B0-B11 AID12 | B12-B19 RU Allocation | B20 ULFEC Coding Type | B21-B24 UL EHTMCS | B25 Received | B26-B31 SS Allocation | B32-B38 UL Target Rec Pwr | B39 PS160 | B40-B42 Preamble Puncturing Pattern | Trigger Dependent User Info |

FIG. 3

| B40-B42 | BW40 | BW80 | BW160 | BW320 (with 160M Duplication) |
|---|---|---|---|---|
| 000 | [1 X] | [1 X X X] | [1 X X X X X X X] | [1 X X X X X X X] |
| 001 | [X 1] | [X 1 X X] | [X 1 X X X X X X] | [X 1 X X X X X X] |
| 010 |  | [X X 1 X] | [X X 1 X X X X X] | [X X 1 X X X X X] |
| 011 |  | [X X X 1] | [X X X 1 X X X X] | [X X X 1 X X X X] |
| 100 |  |  | [X X X X 1 X X X] | [X X X X 1 X X X] |
| 101 |  |  | [X X X X X 1 X X] | [X X X X X 1 X X] |
| 110 |  |  | [X X X X X X 1 X] | [X X X X X X 1 X] |
| 111 |  |  | [X X X X X X X 1] | [X X X X X X X 1] |

FIG. 4

EXTREMELY HIGH THROUGHPUT TRIGGER BASED (EHTTB) LEGACY PREAMBLE PUNCTURING FOR FINE TIMING AND FREQUENCY OFFSET ESTIMATION

TECHNICAL FIELD

The present disclosure relates generally to legacy preamble puncturing for fine timing and frequency offset estimation.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 3 illustrates a user information field of an Extremely High Throughput (EHT) information frame;

FIG. 4 illustrates preamble puncturing pattern field values;

DETAILED DESCRIPTION

Overview

Figure 1:
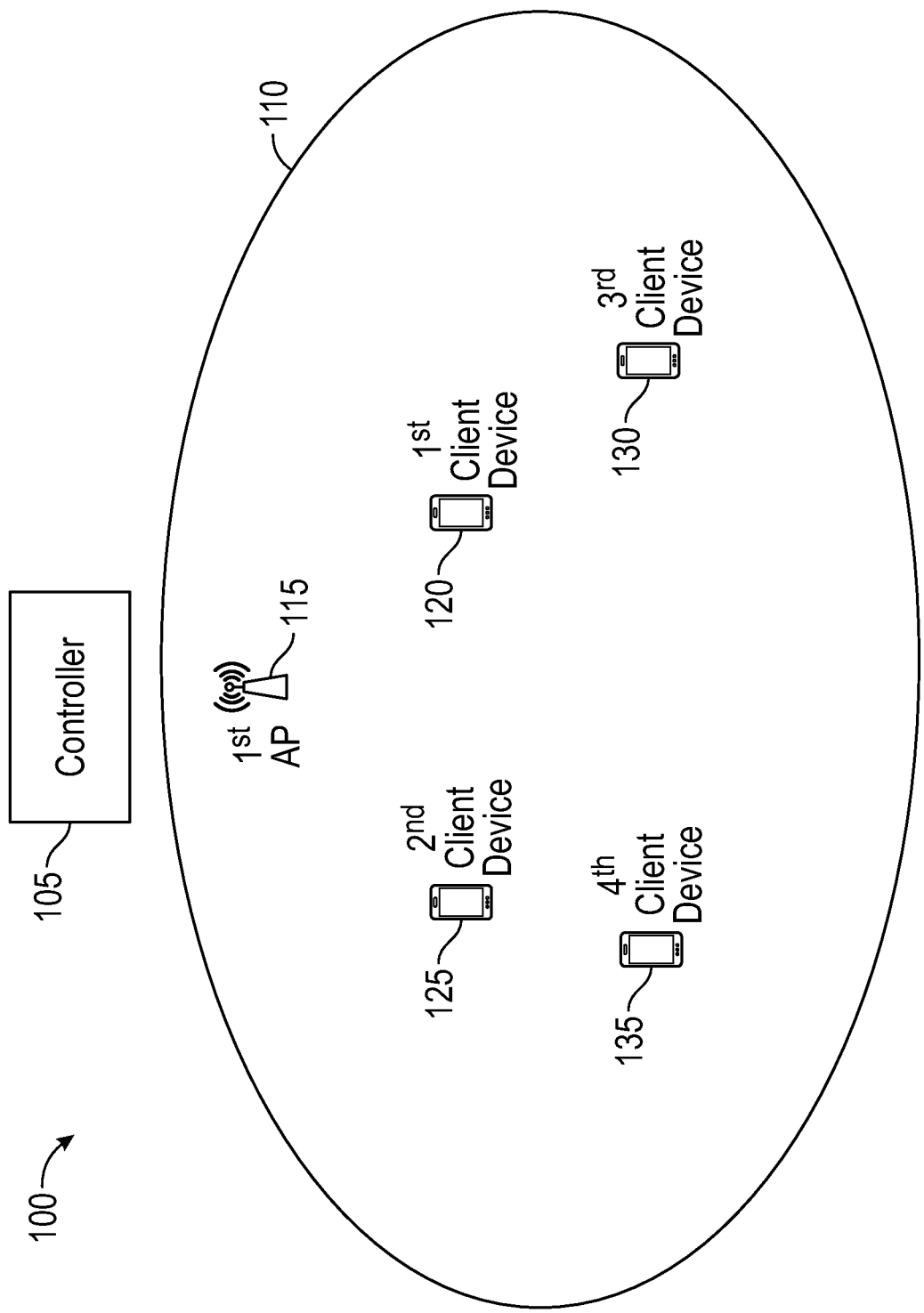
FIG. 1 is a block diagram of an operating environment for providing legacy preamble puncturing for fine timing and frequency offset estimation.

Legacy preamble puncturing for fine timing and frequency offset estimation may be provided. Within a user information field of a trigger frame, a legacy preamble puncturing pattern may be allocated to each of a plurality of client devices wherein each of the plurality of client devices is allocated with at least one respective corresponding non-overlapping sub-channel. Next, from each of the plurality of client devices on their respective corresponding non-overlapping sub-channel, a respective corresponding preamble may be received. Time and frequency synchronization may then be performed for each of the plurality of client devices based on their respective corresponding preamble.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The Institute of Electrical and Electronics Engineers (IEEE) 802.11ax/be standard (i.e., Wi-Fi 6/7) may provide multi-user transmission at Uplink (UL) using a trigger-based mechanism (i.e., High Efficiency Trigger Based (HETB) (IEEE 802.11ax) or Extremely High Throughput Trigger Based (EHTTB) (IEEE 802.11be)). Besides the Time and Frequency synchronization forced by a trigger frame, a very fine time/frequency synchronization may be vital. According to the IEEE 802.11be/ax standard, Carrier Frequency Offset (CFO) errors up to 350 Hz for data subcarriers in HETB/EHTTB frames may be allowed. That may leave up to 700 Hz of CFO error that may need to be estimated and compensated for. Moreover, the Physical-Layer Protocol Data Units (PPDUs) transmitted by stations (i.e., client devices) may be received by an Access Point (AP) within 0.4 µs (assigned by the IEEE 802.11ax/be standard as acceptable transmission margin error) of Trigger Frame Transmission Time (TXTIME)+Short Interframe Space (SIFS)+Round Trip Delay (RTD). Considering, for example, 100 m as the maximum round trip range (i.e., distance), this may lead to 0.33 µs of time offset which, in addition to the 0.4 µs TXTIME freedom, may demand for a system to deal with a about 0.8 µs of time offset error. Such a time offset may need to be estimated per each UL user and compensated for at the AP.

Both Wi-Fi 6 (IEEE802.11ax) and Wi-Fi 7 (IEEE802.11be) include transmission requirements for PPDUs sent in response to a triggering frame. With both standards, the absolute value of residual CFO error (with respect to the corresponding triggering PPDU) of 350 Hz may be allowed. Moreover, PPDUs sent in response to a triggering frame may ensure that the transmission start time is within "±0.4 µs+16 µs" from the end of the trigger frame.

So there is a "0.4 µs" timing error margin in addition to the round trip delay from AP to client device and the other way around.

The current High Efficiency (HE)/Extremely High Throughput (EHT) trigger frames (including both Orthogonal Frequency-Division Multiple Access (OFDMA) and Multi-User, Multiple-Input, Multiple-Output (MU-MIMO) techniques) either skip fine time and frequency synchronization (detection may be possible if frames are received with very low time offset) or exploits overlapped legacy preambles. However, the overlapped legacy preambles may be difficult to use to provide fine time and CFO offset per user.

For a single user receiver (i.e., client device) on Wi-Fi systems (including Wi-Fi 6 and Wi-Fi 7), cross-correlation based techniques may be used for fine timing using the Legacy Long Training Field (L-LTF). The estimated fine timing may reveal a sample index that may be used for the rest of the PPDU processing as a time reference point. Exploiting that, the fine CFO estimation may be performed via auto-correlation based techniques using the legacy L-LTF. The estimated fine CFO may be used to compensate the residual CFO error in the time domain before processing OFDMA symbols in the frequency domain:

$$k_\tau = \underset{k}{\mathrm{argmax}} \sum_{n=1}^{N} r_{k+n} s_n^* \quad (1)$$

$$CFO = \frac{f_s}{2\pi N} \mathrm{angle}\left\{\sum_{n=1}^{N} r_{k+n} r_{k+n+N}^*\right\} \quad (2)$$

where, in equations (1) and (2), $r_m$ denotes the $k^{th}$ sample of the legacy preamble L-LTF. However, in the case of multi-user receivers in Wi-Fi systems, equations (1) and (2) may change to:

$$k_\tau = \underset{k}{\mathrm{argmax}} \sum_{n=1}^{N} \sum_{m=1}^{M} r_{m,k+n} s_n^* \quad (3)$$

$$CFO = \frac{f_s}{2\pi N} \mathrm{angle}\left\{\sum_{n=1}^{N} \sum_{m=1}^{M} \sum_{m'=1}^{M} r_{m,k+n} r_{m',k+n+N}^*\right\} \quad (4)$$

where, in equations (3) and (4), m=1, ..., M indicates the index of users and $r_{m,k}$ denotes the $k_{th}$ sample of the received legacy preamble L-LTF coming from the $M^{th}$ user. Moreover, $f_s$ and $s_n$ represent the sampling frequency and the $n^{th}$ sample of the known L-LTF in the time domain, respectively.

Equations (3) and (4) may comprise a mathematical expression that the transmitted signal by multiple users may be arriving simultaneously and may not be separated in the time domain. Therefore, using equations (3) and (4) may provide an estimate of the resultant of all users time and frequency offsets.

FIG. 1 shows an operating environment 100 for providing legacy preamble puncturing for fine timing and frequency offset estimation. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to a WLAN for client devices). The plurality of APs may include, but are not limited to, a first AP 115 in addition to other APs. The plurality of APs may provide wireless network access to a plurality of client devices as they move within coverage environment 110. The plurality of client devices may comprise, but are not limited to, a first client device 120, a second client device 125, a third client device 130, and a fourth client device 135. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs and the plurality of client devices may be compatible with specification standards such as, but not limited to, the Institute of Electrical and Electronics Engineers (IEEE) 802.11ax/be specification standard for example.

Controller 105 may comprise a Wireless Local Area Network Controller (WLC) and may provision and control coverage environment 110 (e.g., a WLAN). Controller 105 may allow first client device 120, second client device 125, third client device 130, and fourth client device 135 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide legacy preamble puncturing for fine timing and frequency offset estimation.

The elements described above of operating environment 100 (e.g., controller 105, first AP 115, first client device 120, second client device 125, third client device 130, or fourth client device 135) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 7, the elements of operating environment 100 may be practiced in a computing device 700.

Consistent with embodiments of the disclosure, a legacy preamble puncturing pattern may be allocated to each user (i.e., client device) within a trigger frame where each user is allocated with at least one non-overlap (frequency domain) sub-channel. Once each user is allocated with one non-overlapped legacy preamble puncturing pattern and applies it, the received preamble by the AP (e.g., first AP 115) may be unique to each user (or cluster of users) per each sub-channel. Then the AP may run auto-correlation processes to estimate the fine timing offset per each user followed by a cross-correlation process to estimate the fine frequency offset.

Puncturing (including legacy preamble, Extremely High Throughput (EHT) preamble, or data sub-channels) may be used in IEEE 802.11be (Wi-Fi 7) frames in order to increase the overall throughput at high Bandwidth (BW) (e.g., 80/160/320 MHz), however embodiments of the disclosure may be applied to the legacy preamble and may exploit different patterns. Embodiments of the disclosure may support up to 1/2/4/8/16 users (e.g., the maximum number of UL users with HETB/EHTTB may be 8) for BWs 20/40/ 80/160/320 MHz, respectively. In cases where the number of users is more than the number of available sub-channels (to be allocated per each user), the AP may form multiple clusters and may allocate one non-overlapped legacy preamble sub-channel per each cluster, where users in each cluster may share a non-overlapped legacy preamble.

A fully segregated process may be described below with respect to FIG. 2 where each user (e.g., client device) may be allocated with one unique sub-channel. A partially segregated process may be described with respect to FIG. 5 for lower Bandwidth (BW) system where the number of users exceeds the number of available sub-channels.

Figure 2:
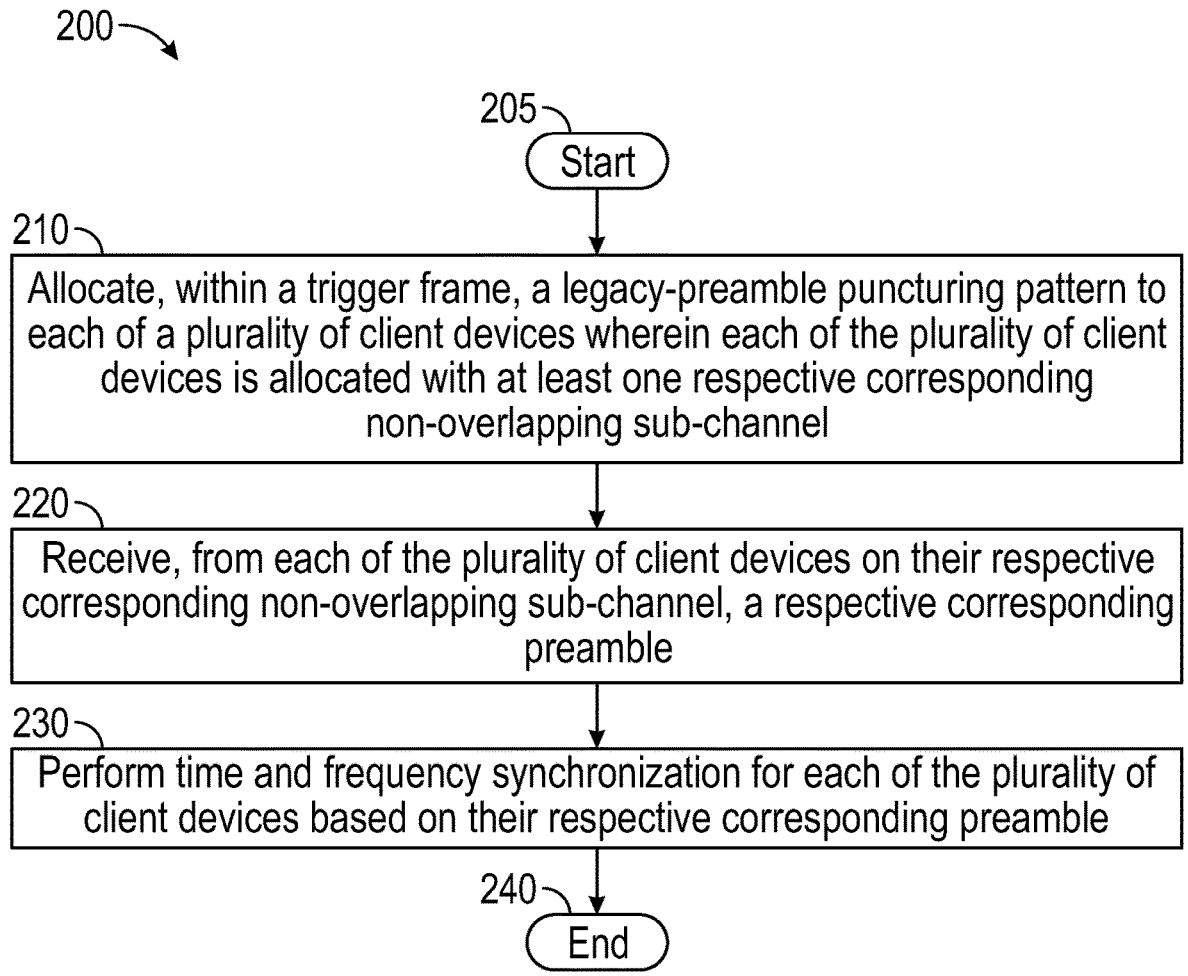
FIG. 2 is a flow chart of a method for providing legacy preamble puncturing for fine timing and frequency offset estimation.

FIG. 2 is a flow chart setting forth the general stages involved in a method 200 consistent with embodiments of the disclosure for providing legacy preamble puncturing for fine timing and frequency offset estimation. Method 200 may be implemented using first AP 115 as described in more detail above with respect to FIG. 1. Ways to implement the stages of method 200 will be described in greater detail below.

Method 200 may begin at starting block 205 and proceed to stage 210 where first AP 115 may allocate, within a user information field of a trigger frame, a legacy preamble puncturing pattern to each of a plurality of client devices wherein each of the plurality of client devices is allocated with at least one respective corresponding non-overlapping sub-channel. For example, the plurality of client devices may comprise first client device 120, second client device 125, third client device 130, or fourth client device 135.

Embodiments of the disclosure may apply the following amendments to the current Wi-Fi 7 standard. First, a one bit field may be used at the HETB/EHTTB common information field of the trigger frame to indicate the availability of the legacy preamble puncturing option. For example, this one bit field may comprise, but is not limited to, B63 within the common information field. This bit may be set to "0" for de-activating legacy preamble puncturing and may be set to "1" for activating legacy preamble puncturing. As the legacy preamble puncturing is not available at BW 20 MHz, B63 at HETB/EHTTB common information field of trigger frame may be set to "0".

A second amendment may comprise a legacy preamble puncturing pattern field. The proposed legacy preamble puncturing pattern for each user may use an extra 3 bit length field (e.g., to support a maximum of 8 users) within the user information field of the trigger frame. As shown in FIG. 3, the current user information field of the trigger frame in IEEE 802.11ax/be may have variable length. Accordingly, embodiments of the disclosure may add 3 bits (e.g., B40-B42) as the legacy preamble puncturing pattern field.

FIG. 4 illustrates example preamble puncturing pattern field values (e.g., in B40-B42) for selected BWs. Wi-Fi 7 may not support EHTTB for 320 MHz BW based on IEEE 802.11be. However, when future releases add this capability or extended the number of users, embodiments of the disclosure may increase the number of preamble puncturing pattern bits from 3 bits to 4 bits to support 16 users at 320 MHz BW.

From stage 210, where first AP 115 allocates, within the user information field of the trigger frame, the legacy preamble puncturing pattern to each of the plurality of client devices wherein each of the plurality of client devices is allocated with at least one respective corresponding non-overlapping sub-channel, method 200 may advance to stage 220 where first AP 115 may receive, from each of the plurality of client devices on their respective corresponding non-overlapping sub-channel, a respective corresponding preamble. For example, once each user is allocated with one non-overlapped legacy preamble puncturing pattern and applies it, the received preamble by first AP 115 may be unique to each user (or cluster of users) per each sub-channel.

Once first AP 115 receives, from each of the plurality of client devices on their respective corresponding non-overlapping sub-channel, the respective corresponding preamble in stage 220, method 200 may continue to stage 230 where first AP 115 may perform time and frequency synchronization for each of the plurality of client devices based on their respective corresponding preamble. For example, once first AP 115 receives the unique sub-channel of the legacy preamble, it may perform the proposed time and frequency synchronization as described above in equations (1) and (2) per each user. Accordingly the final solution for the time and frequency offset of the $m^{th}$ user may be:

$$k_{m,\tau} = \underset{k}{\mathrm{argmax}} \sum_{n=1}^{N} r_{m,k+n} s_n^* \tag{5}$$

$$CFO_m = \frac{f_s}{2\pi N} \mathrm{angle}\left\{ \sum_{n=1}^{N} r_{m,k+n} r_{m,k+n+N}^* \right\} \tag{6}$$

where, in equations (5) and (6), $r_{m,k}$ denotes the $k^{th}$ sample of the legacy preamble Legacy Long Training Field (L-LTF) at the $m^{th}$ sub-channel. Once first AP 115 performs the time and frequency synchronization for each of the plurality of client devices based on their respective corresponding preamble in stage 230, method 200 may then end at stage 240.

Figure 5:
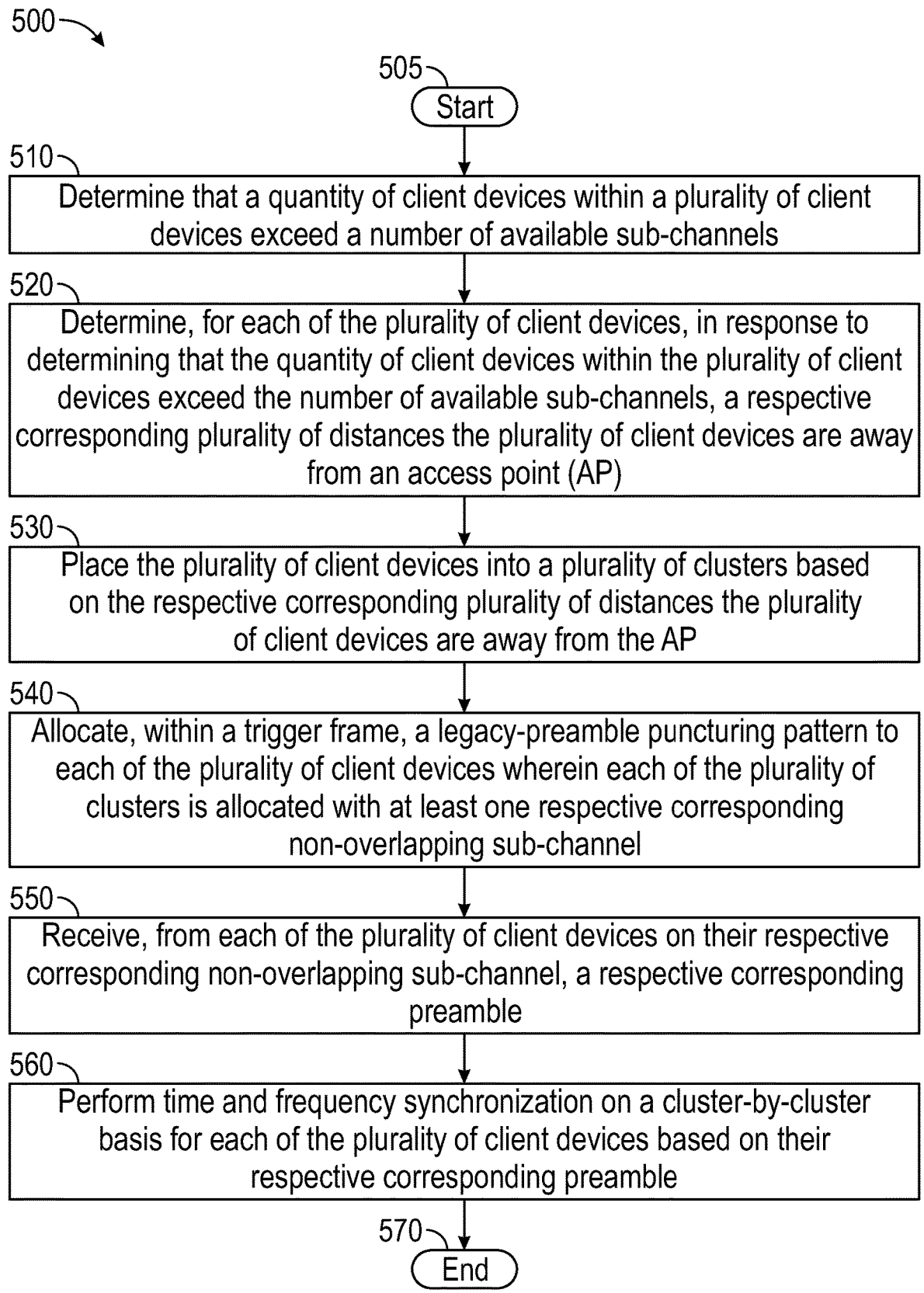
FIG. 5 is a flow chart of a method for providing legacy preamble puncturing for fine timing and frequency offset estimation.

FIG. 5 is a flow chart setting forth the general stages involved in a method 500 consistent with embodiments of the disclosure for providing legacy preamble puncturing for fine timing and frequency offset estimation. Method 500 may be implemented using first AP 115 as described in more detail above with respect to FIG. 1. Ways to implement the stages of method 500 will be described in greater detail below.

Method 500 may begin at starting block 505 and proceed to stage 510 where first AP 115 may determine that a quantity of client devices within a plurality of client devices exceed a number of available sub-channels. For example, in lower BW systems, where the number of users (e.g., client devices) exceeds the number of available sub-channels, "clustering" may be used. In this example, there may be four user devices (first client device 120, second client device 125, third client device 130, and fourth client device 135) and only two sub-channels (e.g., two 20 MHz sub-channels in a 40 MHz channel).

From stage 510, where first AP 115 determines that the quantity of client devices within the plurality of client devices exceed the number of available sub-channels, method 500 may advance to stage 520 where first AP 115 may determine, for each of the plurality of client devices, in response to determining that the quantity of client devices within the plurality of client devices exceed the number of available sub-channels, a respective corresponding plurality of distances the plurality of client devices are away from first AP 115. For example, first AP 115 may measures the Received Signal Strength Indicator (RSSI) of each client device during a Multi-User Clear To Send (MU-CTS) reception and use this to determine the distances between first AP 115 and each of first client device 120, second client device 125, third client device 130, and fourth client device 135.

Figure 6:
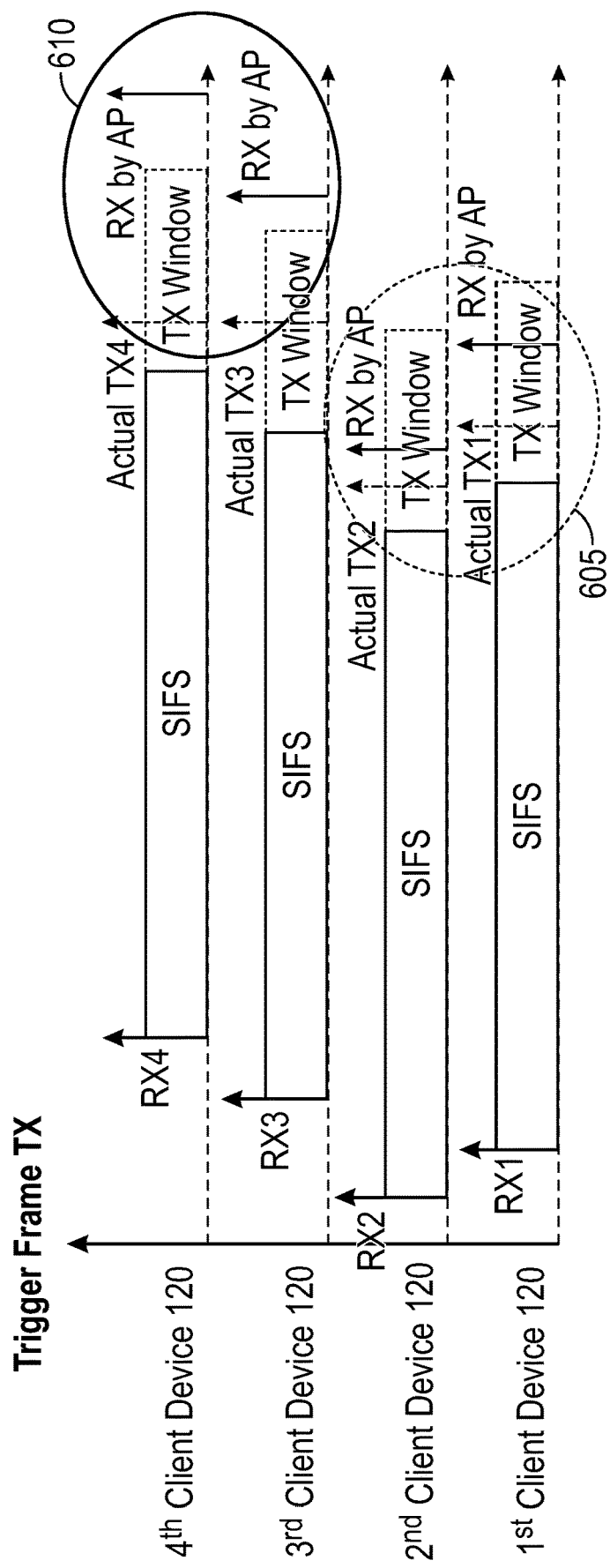
FIG. 6 illustrates clusters in a partially segregated system.

Once first AP 115 determines, for each of the plurality of client devices, in response to determining that the quantity of client devices within the plurality of client devices exceed the number of available sub-channels, the respective corresponding plurality of distances the plurality of client devices are away from first AP 115 in stage 520, method 500 may continue to stage 530 where first AP 115 may place the plurality of client devices into a plurality of clusters based on the respective corresponding plurality of distances the plurality of client devices are away from first AP 115. For example, first AP 115 may measure the RSSI of each user during the MU-CTS reception and clusters users with the same (or close enough, e.g., within 10 to 15 dB) RSSI in the same cluster. This may reduce the fine timing error between users in the same cluster due to lower round-trip delay differences for example. As shown in FIG. 6, based on distance from first AP 115, first client device 120 and second client device 125 may be placed in a first cluster 605 while third client device 130 and fourth client device 135 may be places in a second cluster 610.

After first AP 115 places the plurality of client devices into the plurality of clusters based on the respective corresponding plurality of distances the plurality of client devices are away from first AP 115 in stage 530, method 500 may proceed to stage 540 where first AP 115 may allocate, within a user information field of a trigger frame, a legacy preamble puncturing pattern to each of the plurality of client devices wherein each of the plurality of clusters is allocated with at least one respective corresponding non-overlapping sub-channel. For example, in lower BW systems, where the number of users exceeds the number of available sub-channels, embodiments of the disclosure may provide a clustering approach. Clustering may allow a unique puncturing pattern to each cluster where users at the same cluster may receive the same puncturing pattern.

Once first AP 115 allocates, within the user information field of the trigger frame, the legacy preamble puncturing pattern to each of the plurality of client devices wherein each of the plurality of clusters is allocated with at least one respective corresponding non-overlapping sub-channel in stage 540, method 500 may continue to stage 550 where first AP 115 may receive, from each of the plurality of client devices on their respective corresponding non-overlapping sub-channel, a respective corresponding preamble. For example, each sub-channel may be processed based on multiple preambles received from multiple users on the allocated sub-channel.

After first AP 115 receives, from each of the plurality of client devices on their respective corresponding non-overlapping sub-channel, the respective corresponding preamble in stage 550, method 500 may proceed to stage 560 where first AP 115 may perform time and frequency synchronization on a cluster-by-cluster basis for each of the plurality of client devices based on their respective corresponding preamble. For example, the process described above with respect to equations (3) and (4) may be used for multiple users per sub-channel. Although this approach may not guarantee the same timing and frequency offset, it may reduce the number of users within equations (3) and (4), which may lead to performance improvements of approaches that aim to decompose the received signal from multiple users and extract per user time and frequency offset. Once first AP 115 performs time and frequency synchronization on a cluster-by-cluster basis for each of the plurality of client devices based on their respective corresponding preamble in stage 560, method 500 may then end at stage 570.

Figure 7:
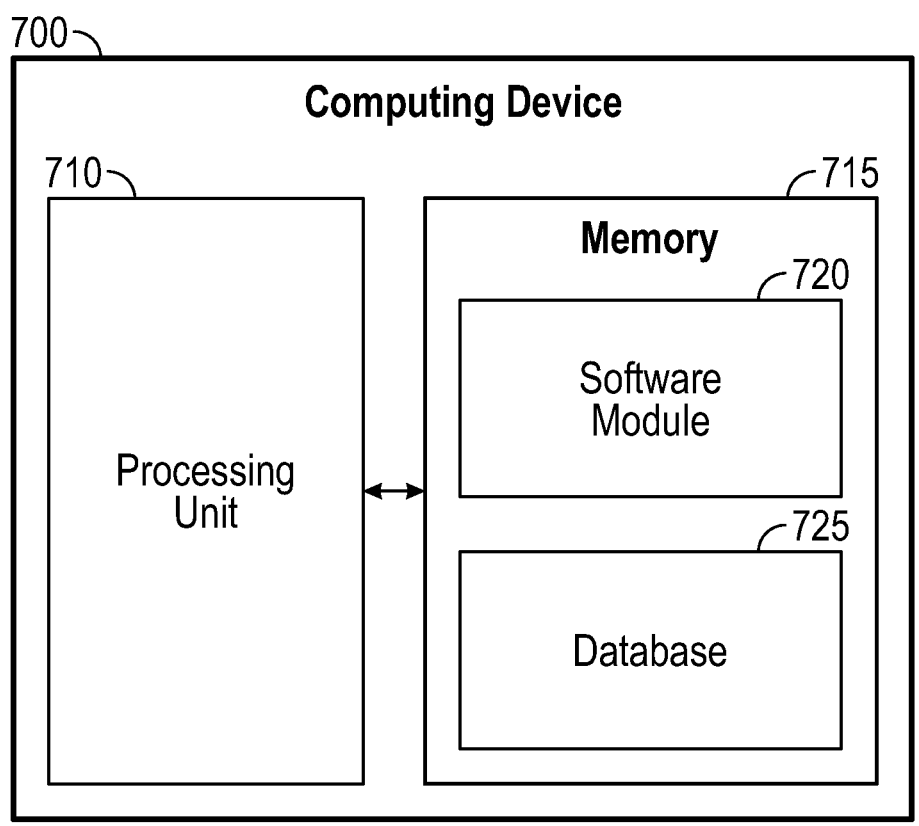
FIG. 7 is a block diagram of a computing device.

FIG. 7 shows computing device 700. As shown in FIG. 7, computing device 700 may include a processing unit 710 and a memory unit 715. Memory unit 715 may include a software module 720 and a database 725. While executing on processing unit 710, software module 720 may perform, for example, processes for providing legacy preamble puncturing for fine timing and frequency offset estimation as described above with respect to FIG. 2 and FIG. 5. Computing device 700, for example, may provide an operating environment for controller 105, first AP 115, first client device 120, second client device 125, third client device 130, or fourth client device 135. Controller 105, first AP 115, first client device 120, second client device 125, third client device 130, or fourth client device 135 may operate in other environments and are not limited to computing device 700.

Computing device 700 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    allocating, within a user information field of a trigger frame, a legacy preamble puncturing pattern to each of a plurality of client devices wherein each of the plurality of client devices is allocated with at least one respective corresponding non-overlapping sub-channel;
    receiving, from each of the plurality of client devices on their respective corresponding non-overlapping sub-channel, a respective corresponding preamble; and
    performing time and frequency synchronization for each of the plurality of client devices based on their respective corresponding preamble wherein the respective corresponding preamble is extracted from a Physical Layer Protocol Data Unit (PPDU) received in response to the trigger frame.

2. The method of claim 1, further comprising indicating that legacy preamble puncturing is active by setting a bit in a common information field of the trigger frame.

3. The method of claim 2, wherein the bit comprises bit 63 within the common information field of the trigger frame.

4. The method of claim 1, wherein allocating, within the user information field of the trigger frame, the legacy preamble puncturing pattern comprises setting a plurality of bits in a user information field of the trigger frame.

5. The method of claim 4, wherein the plurality of bits begin with bit 40 in the user information field of the trigger frame.

6. The method of claim 4, wherein the plurality of bits comprise 3 bits for channels up to 160 MHz.

7. The method of claim 4, wherein the plurality of bits comprise 4 bits for channels up to 320 MHz.

8. The method of claim 1, wherein performing time and frequency synchronization comprises performing a fine timing and Carrier Frequency Offset (CFO) estimation.

9. The method of claim 8, wherein performing the fine timing and CFO estimation comprises using cross-correlation based techniques using a Legacy Long Training Field (L-LTF).

10. A method comprising:
    determining that a quantity of client devices within a plurality of client devices exceed a number of available sub-channels;
    determining, for each of the plurality of client devices, in response to determining that the quantity of client devices within the plurality of client devices exceed the number of available sub-channels, a respective corresponding plurality of distances the plurality of client devices are away from an Access Point (AP);
    placing the plurality of client devices into a plurality of clusters based on the respective corresponding plurality of distances the plurality of client devices are away from the AP;
    allocating, within a user information field of a trigger frame, a legacy preamble puncturing pattern to each of the plurality of client devices wherein each of the plurality of clusters is allocated with at least one respective corresponding non-overlapping sub-channel;
    receiving, from each of the plurality of client devices on their respective corresponding non-overlapping sub-channel, a respective corresponding preamble; and
    performing time and frequency synchronization on a cluster-by-cluster basis for each of the plurality of client devices based on their respective corresponding preamble.

11. The method of claim 10, further comprising indicating that legacy preamble puncturing is active by setting a bit in a common information field of the trigger frame.

12. The method of claim 11, wherein the respective corresponding preamble is extracted from a Physical Layer Protocol Data Unit (PPDU) received in response to the trigger frame.

13. The method of claim 11, wherein performing time and frequency synchronization comprises performing a fine timing and Carrier Frequency Offset (CFO) estimation.

14. The method of claim 13, wherein performing the fine timing and CFO estimation comprises using cross-correlation based techniques using a Legacy Long Training Field (L-LTF).

15. A system comprising:
a memory storage; and
a processing unit coupled to the memory storage, wherein the processing unit is operative to:
- allocate, within a user information field of a trigger frame, a legacy preamble puncturing pattern to each of a plurality of client devices wherein each of the plurality of client devices is allocated with at least one respective corresponding non-overlapping sub-channel;
- receive, from each of the plurality of client devices on their respective corresponding non-overlapping sub-channel, a respective corresponding preamble; and
- perform time and frequency synchronization for each of the plurality of client devices based on their respective corresponding preamble wherein the processing unit being operative to perform time and frequency synchronization comprises the processing unit being operative to perform a fine timing and Carrier Frequency Offset (CFO) estimation wherein the processing unit being operative to perform the fine timing and CFO estimation comprises the processing unit being operative to use cross-correlation based techniques using a Legacy Long Training Field (L-LTF).

16. The system of claim 15, wherein the processing unit is further operative to indicate that legacy preamble puncturing is active by setting a bit in a common information field of the trigger frame.

17. The system of claim 15, wherein the respective corresponding preamble is extracted from a Physical Layer Protocol Data Unit (PPDU) received in response to the trigger frame.

* * * * *